(12) United States Patent
Schurtakow et al.

(10) Patent No.: US 9,492,776 B2
(45) Date of Patent: Nov. 15, 2016

(54) RADIAL-FLOW SCRUBBER

(71) Applicant: Outotec (Finland) Oy, Espoo (FI)

(72) Inventors: Bernd Schurtakow, Friedrichsdorf (DE); Henning Nixdorff, Bad Homburg v.d.H (DE); Alexander Göllner, Nidderau (DE); Gertrud Serdarusic, Sulzbach (DE)

(73) Assignee: Outotec (Finland) Oy, Espoo (FI)

( * ) Notice: Subject to any disclaimer, the term of this patent is extended or adjusted under 35 U.S.C. 154(b) by 111 days.

(21) Appl. No.: 14/429,316

(22) PCT Filed: Oct. 5, 2012

(86) PCT No.: PCT/EP2012/004181
§ 371 (c)(1),
(2) Date: Mar. 18, 2015

(87) PCT Pub. No.: WO2014/053150
PCT Pub. Date: Apr. 10, 2014

(65) Prior Publication Data
US 2015/0258486 A1  Sep. 17, 2015

(51) Int. Cl.
*B01D 47/10* (2006.01)
*B01D 53/14* (2006.01)
*B01F 3/04* (2006.01)
*B01D 53/24* (2006.01)

(52) U.S. Cl.
CPC ............. *B01D 47/10* (2013.01); *B01D 53/14* (2013.01); *B01D 53/24* (2013.01); *B01F 3/04007* (2013.01); *B01D 2247/06* (2013.01); *B01D 2247/08* (2013.01)

(58) Field of Classification Search
CPC ...... B01D 47/10; B01D 53/14; B01D 53/24; B01F 3/04; B01F 3/04007
USPC ...................... 96/243, 301; 95/218
See application file for complete search history.

(56) References Cited

U.S. PATENT DOCUMENTS 3,199,267 A   8/1965 Hausberg
3,834,127 A   9/1974 Jordan et al.
(Continued)

FOREIGN PATENT DOCUMENTS

DE  10 2009 016 731 A1  10/2010
DE  10 2010 022 840 A1  12/2011

OTHER PUBLICATIONS

International search report from corresponding PCT Application No. PCT/EP2012/004181, mailed Jul. 1, 2013, 2 pgs.
(Continued)

*Primary Examiner* — Robert A Hopkins
(74) *Attorney, Agent, or Firm* — Chernoff, Vilhauer, McClung & Stenzel, LLP

(57) ABSTRACT

A radial-flow scrubber (1, 100) for separating dust and pollutants from gases, comprises a housing (2), a raw gas inlet (3), a feeder (4) for a washing liquid, a washing zone (5), a clean gas outlet (10), and an outlet (11) for the washing liquid. The washing zone (5, 101) comprises an inlet funnel (7, 105), a scrubbing zone (18) having an adjustable flow cross-section, and a drive (10, 110) for adjusting the cross section of the scrubbing zone (18), as well as a tubular shell (8,108) detachably mounted to the housing (2), wherein in a ceiling of the housing (2) an opening is provided through which the complete washing zone (5, 101) can be integrally withdrawn.

9 Claims, 2 Drawing Sheets

(56) References Cited

U.S. PATENT DOCUMENTS 4,145,193 A    3/1979   Hegemann
4,874,400 A *  10/1989  Jury .................... B01D 53/504
                                                        95/218
8,691,000 B2   4/2014   Nixdorff

OTHER PUBLICATIONS

International Preliminary Report on Patentability from corresponding PCT application No. PCT/EP2012/004181, issued Apr. 7, 2015, 8 pgs.

* cited by examiner

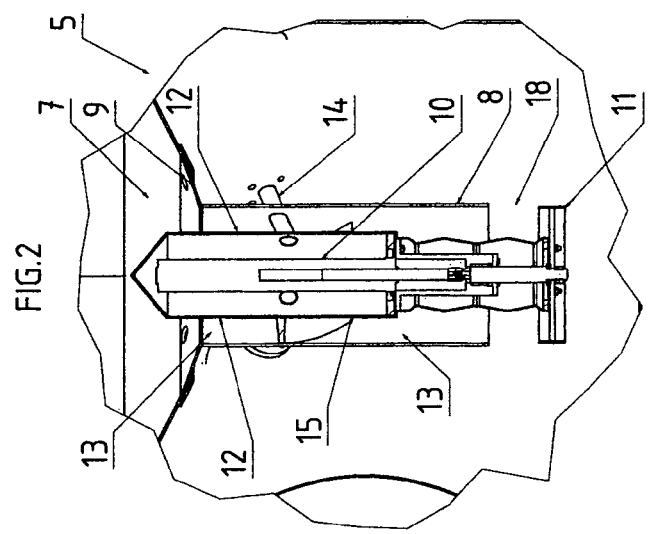
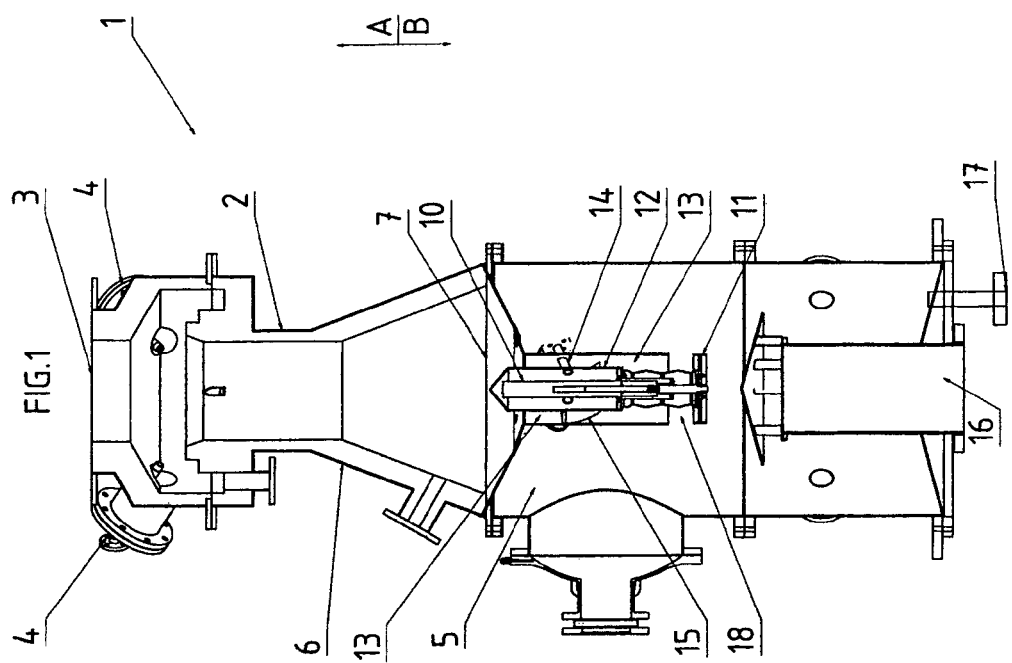

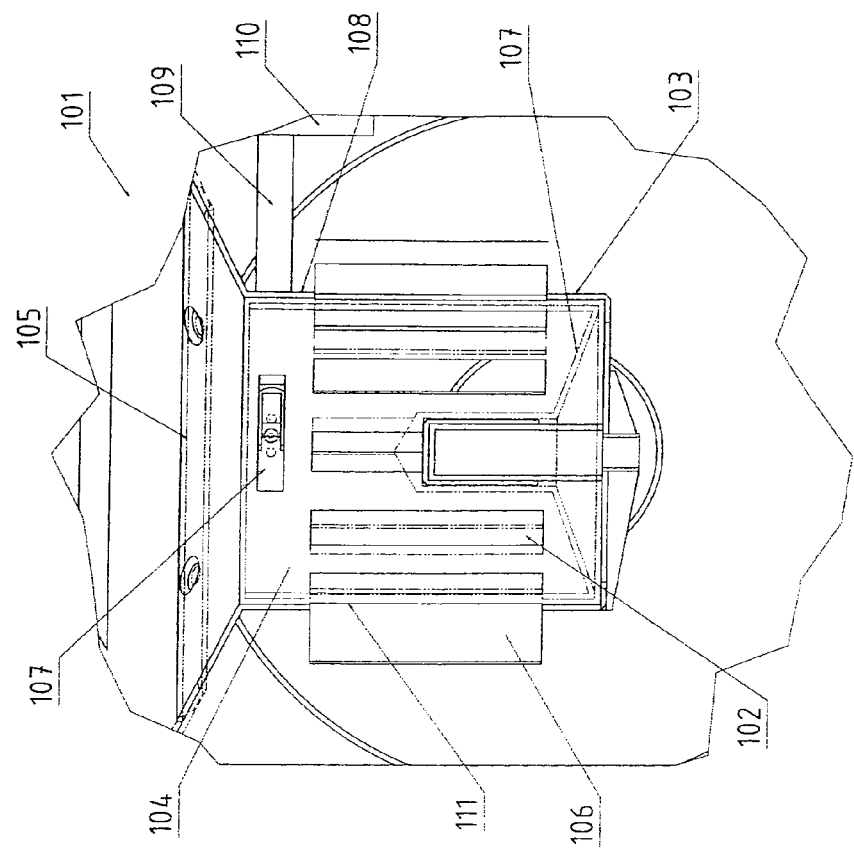
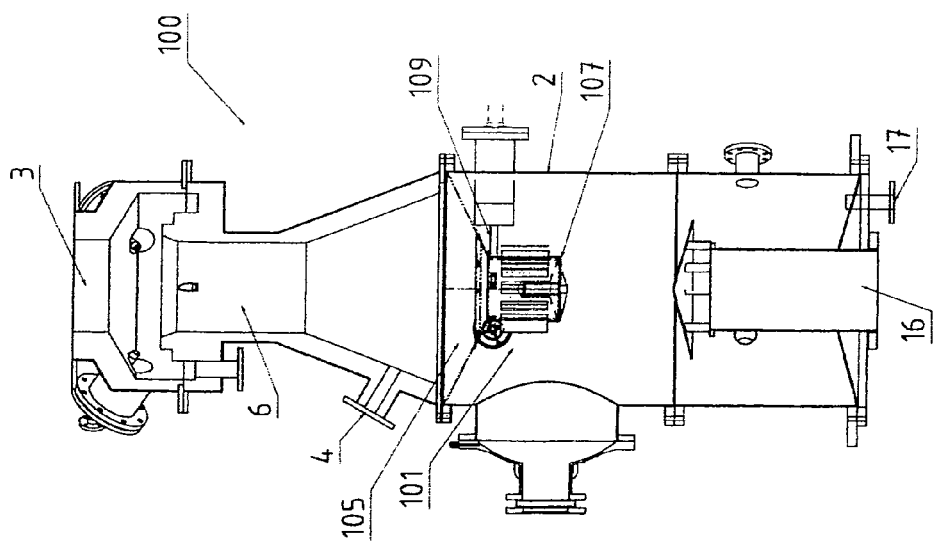

RADIAL-FLOW SCRUBBER

CROSS-REFERENCE TO RELATED APPLICATIONS

This is a national stage application filed under 35 USC 371 based on International Application No. PCT/EP2012/004181 filed Oct. 5, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Not applicable.

BRIEF SUMMARY OF THE INVENTION

Not Applicable.

The present invention relates to a radial-flow scrubber for separating dust and pollutants from gases, comprising a housing, a raw gas inlet, a feeder for washing liquid, a washing zone, a clean gas outlet, and an outlet for the washing liquid, wherein the washing zone comprises an inlet funnel, a Venturi zone having an adjustable flow cross-section, and a drive for adjusting the cross section of the Venturi zone.

Radial-flow scrubbers are a special type of wet-gas scrubbers utilizing the so called Venturi effect. The raw gas stream to be cleaned is used for splitting the washing liquid into extremely fine droplets, which then capture and thus remove dust and pollutants from the raw gas stream to be cleaned.

Radial-flow scrubbers usually are adjustable scrubbers, which provide for an adjustment to different operating values with the gas throughput fluctuating in time. Adjustable radial flow scrubbers are described e.g. in documents DE 10 2009 016 731 A1 or DE 10 2010 022 840 A1. The relative velocity between gas and washing liquid is decisive for the washing effect. Due to the Venturi effect, the best washing effect is obtained in the narrowest cross-section of the washing zone.

In practice, radial-flow scrubbers are usually provided with fixedly mounted washing zones, wherein a tunnel is provided in the horizontal direction through the scrubber to house a drive unit for adjusting the Venturi zone. An adjustable plate is connected with the tunnel in a gastight fashion by way of a bellows. A push rod for moving the plate is guided in the tunnel. The upward and downward movement of the plate is driven by a worm drive located on the bottom of the tunnel. The worm drive is driven by a motor. Further, a hand wheel is provided comprising a potentiometer to show the position of the plate. The drive unit has to be assembled within the tunnel and coupled to the Venturi plate in a cumbersome way. A manhole is provided in the scrubber housing to provide access to the Venturi plates. If maintenance operations are necessary, the scrubber has to be shut down until the maintenance operation is finished.

It is an object of the present invention to provide for an easier access to the washing zone and to avoid long time shut downs for maintenance operations.

According to the present invention there is provided a radial-flow scrubber. The washing zone comprises a tubular shell detachably mounted in the housing, wherein in a ceiling of the housing an opening is provided through which the complete washing zone can be integrally withdrawn.

Accordingly, the complete washing zone including the drive unit can be integrally withdrawn from the housing through the opening in the ceiling and maintenance or repair operations can be easily performed in a work shop outside the radial-flow scrubber housing. This provides for easy access to the drive unit or other parts of the washing zone. Shut down times of the radial flow-scrubber can be minimized if the washing zone to be repaired is replaced by a reserve unit. In this case, the scrubber has to be shut down only for the time required to remove the washing zone from the scrubber housing and to introduce the reserve unit.

According to the preferred embodiment of the present invention, the shell has a substantially circular cross-section providing for uniform gas streams.

According to the invention, the shell is flanged into the housing or alternatively to the raw gas inlet. Thereby, an easy mounting operation is secured.

The washing zone is formed between two circular rings through which the gas and the scrubbing liquid flow radially from inside to the outside. The decisive relative velocity between the gas and scrubbing liquid is the result of the cleaning effect in the narrowest cross-section of the washing zone. The lower ring of the washing zone will be adjustable mechanically or hydraulically. The mechanical adjustment of the lower ring can be actuated by an integrated linear drive.

According to the preferred embodiment, the drive is mounted in a drive casing coaxially within the shell. In between the drive casing and the shell a conduit is provided through which the gas stream/droplet mixture flows towards the scrubbing zone. Thereby, the drive unit does not interfere with the gas stream and an intended flow direction can be secured. It may be advantageous to provide one or more guide plates in the conduit inducing a rotating motion of the mixed stream of gas and washing liquid. Thereby, the washing effect can be increased.

In another preferred embodiment of the present invention the washing zone includes a first circular-segment cylinder with a plurality of circular segments spaced from each other and a second circular-segment cylinder with a plurality of circular segments spaced from each other, wherein the second circular-segment cylinder is arranged in the first circular-segment cylinder and wherein the two circular-segment cylinders are movable relative to each other. Thereby, the gas velocity and pressure loss can be optimally varied in a simple manner by adjusting the narrowest cross section. By providing two circular-segment cylinders arranged one inside the other, no expensive mechanism for adjusting a diffusor space must be arranged in the washing zone.

Preferably, the first, outer circular-segment cylinder is fixedly mounted to the inlet funnel and the second, inner circular segment cylinder is rotatably mounted. The optimal washing effect is adjusted in dependence on the actual volumetric flow rate by shifting second, inner circular segment cylinder in the outer circular segment cylinder.

In a preferred embodiment of the invention, the drive is a linear drive which does not take much place and can be easily coaxially mounted within the washing zone unit so that it can be withdrawn with the washing zone unit through the opening in the ceiling of the housing.

The washing zone can be arranged alternatively with gas entry from above or from below.

BRIEF DESCRIPTION OF THE SEVERAL VIEWS OF THE DRAWINGS

The invention will now be described in more detail on the basis of the following description of preferred embodiments and the drawing. All features described and/or illustrated form the subject matter of the intention per se or in any combination, independent of the combination in the claims or their back reference.

In the drawing:

FIG. 1 shows a cross-section of a radial-flow scrubber according to a first embodiment of the present invention, FIG. 2 is an enlarged partially cut away perspective view of the washing zone used in the scrubber according to FIG. 1, FIG. 3 is a cross-section of a radial-flow scrubber according to a second embodiment of the present invention, FIG. 4 is an enlarged partially cut away perspective view of the scrubber according to FIG. 3 wherein the washing unit is shown in more detail.

DETAILED DESCRIPTION OF THE INVENTION

The radial-flow scrubber of the invention as shown in the drawings serves to separate dust and pollutants from useful and waste gases, wherein an adjustable washing zone provides for uniformly high separation efficiency, in that with varying gas throughput a uniform flow velocity of the volumetric gas flow and consequently a uniform decrease in pressure is achieved.

In the embodiment depicted in FIGS. 1 and 2, a radial-flow scrubber 1 comprises a housing 2, a raw gas inlet 3 arranged at the upper end thereof, one or more feeders 4 for the washing liquid, and a washing zone 5. The raw gas introduced from the inlet 3 flows vertically downwards through a first Venturi 6 to an inlet funnel 7 of the washing zone 5. At the same time, washing liquid is added, for example injected, through feeders 4.

The washing unit 5 comprises a tubular outer shell 8. Depending on the direction of the gas flow the washing zone can be mounted via a flange 9 to the outer wall of the housing 2 or into the gas inlet 3.

As evident from FIG. 2, within the shell 8 a drive unit 10 is coaxially provided, which preferably comprises an electric linear drive to move a lower ring 11 in the vertical direction (direction indicated by arrows A and B). Between the casing 12 of the drive unit 10 and the shell 8 a conduit 13 is provided through which the gas including the washing liquid droplet flows. Through the shell 8 a radial cable bushing 14 is provided through which electrical wires for operating the drive unit 10 may be introduced.

In the conduit 13 at least one, preferably several guide plates 15 are provided in order to induce a rotating motion onto the gas/liquid mixture.

The cleaned gas is withdrawn from the radial-flow scrubber 1 through gas outlet 16 while the washing liquid is withdrawn through outlets 17 in the lower part of the scrubber 1.

If maintenance or repair operations are necessary for a scrubbing zone 18 or the drive unit 10 of washing zone 5, the complete washing zone 5 including the flange 9, the shell 8, the scrubbing zone 18 and the drive unit 10 housed within the shell 8 are withdrawn from the housing 2 of the radial-flow scrubber 1 through an opening (raw gas inlet 3) provided in the ceiling of the housing 2. Instead of the withdrawn washing zone 5 a reserve unit may be introduced into the scrubber 1 to minimize the shutdown time.

In FIGS. 3 and 4 a second embodiment of the present invention is shown. In most aspects the radial-flow scrubber 100 according to the second embodiment corresponds to radial-flow scrubber 1 as described above with regard to the first embodiment. Corresponding elements are referred to with corresponding reference numbers and a reiterated description thereof is omitted. The major difference between the two embodiments lies in the structure of the washing zone 101.

In the washing zone 101 of the second embodiment the raw gas and the washing liquid are diverted from the vertical into horizontal direction and radially accelerated though openings 111 between individual circular segments 102 of a first, outer circular-segment cylinder 103 and a second, inner circular-segment cylinder 104. The high velocity in the narrow circular segment openings generates a large number of very fine washing liquid droplets. The particles of dust and pollutants contained in the raw gas are intensively mixed with the mist of these very fine droplets. In a particular aspect of the invention, guide vanes 106 are provided on the outside of the openings of the first, outer circular-segment cylinder 103 in order to additionally rotate the mixture of gas and washing liquid.

Due to the high relative velocity between droplets, particles and gas, the particles are captured by the droplets. Outside the two circular-segment cylinders 103, 104 the separation of gas and washing liquid takes place. The first, outer circular-segment cylinder 103 forms a non-continuous shell 108 and is fixedly mounted to the inlet funnel 105 of washing zone 101, while the second, inner circular segment cylinder 104 is movably mounted on a rotatable disc 107. The second, inner circular-segment cylinder 104 is provided with an adjusting drive 110 with push rod 109, which is movably connected with the edge of the inner circular-segment cylinder 104 in order to adjust the openings 111 between the circular segments of the two circular-segment cylinders 103, 104. To withdraw the complete washing zone 101 from the housing 2, push rod 109 is disconnected from the edge of the inner circular-segment cylinder 104 108.

REFERENCE NUMBERS 1 radial-flow scrubber
2 housing
3 raw gas inlet
4 feeder for washing liquid
5 washing zone
6 Venturi
7 inlet funnel 8 shell
9 flange
10 drive unit
11 Plate
12 casing
13 conduit
14 cable bushing
15 guide plate
16 gas outlet
17 liquid outlet
18 scrubbing zone
100 radial-flow scrubber
101 washing zone
102 circular segments
103 first circular-segment cylinder
104 second circular-segment cylinder
105 inlet funnel
106 guide vane
107 disc
108 shell
109 push rod
110 drive
111 opening

SEQUENCE LISTING

Not Applicable.

The invention claimed is:

1. A radial-flow scrubber for separating dust and pollutants from gases, comprising a housing, a raw gas inlet, a feeder for a washing liquid, a washing zone, a clean gas outlet, and an outlet for the washing liquid, wherein the washing zone comprises an inlet funnel, a scrubbing zone having an adjustable flow cross-section, and a drive for adjusting the cross section of the scrubbing zone, characterized in that the washing zone comprises a tubular shell detachably mounted to the housing, wherein in a ceiling of the housing an opening is provided through which the complete washing zone can be integrally withdrawn.

2. The radial-flow scrubber according to claim 1, characterized in that the shell has a substantially circular cross section.

3. The radial-flow scrubber according to claim 1, characterized in that the shell is flanged to the housing or to the raw gas inlet.

4. The radial-flow scrubber according to claim 1, characterized in that the drive is mounted in a casing coaxially within the shell, wherein between the casing and the shell a conduit is provided through which the gas stream flows towards the scrubbing zone.

5. The radial-flow scrubber according to claim 4, characterized in that at least one guide plate is provided in the conduit inducing a rotating motion of the gas stream.

6. The radial-flow scrubber according to claim 1, characterized in that the washing zone includes a first circular-segment cylinder with a plurality of circular segments spaced from each other, and a second circular-segment cylinder with a plurality of circular segments spaced from each other, wherein the second circular-segment cylinder is arranged in the first circular-segment cylinder and wherein the two circular-segment cylinders are movable relative to each other.

7. The radial-flow scrubber according to claim 6, characterized in that the first, outer circular-segment cylinder is fixedly mounted to the inlet funnel and that the second, inner circular-segment cylinder is rotatably mounted.

8. The radial-flow scrubber according to claim 6, characterized in that the openings of the first, outer circular-segment cylinder are provided with guide vanes towards the outside.

9. The radial-flow scrubber according to claim 1, characterized in that the drive is a linear drive.

* * * * *